Nov. 15, 1966  R. R. DE ZURIK  3,285,057
APPARATUS FOR OBTAINING TORQUE MEASUREMENTS
Filed Aug. 19, 1963  2 Sheets-Sheet 1
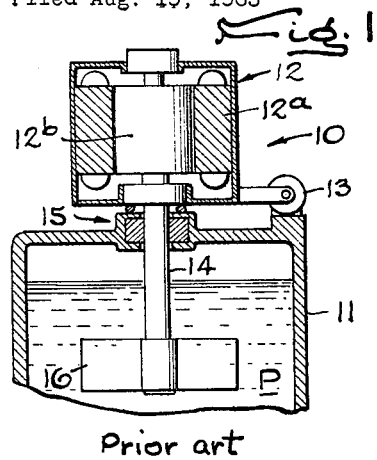
Prior art
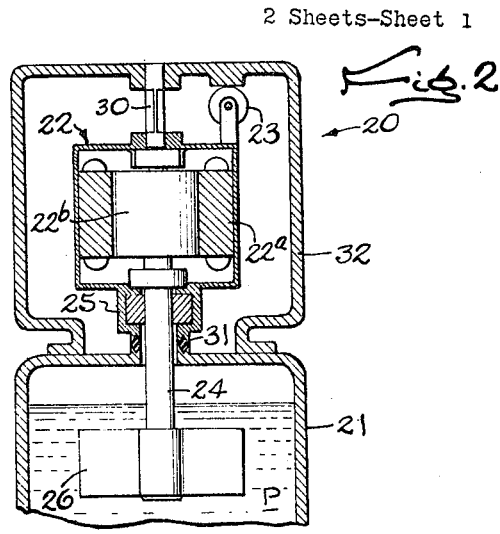
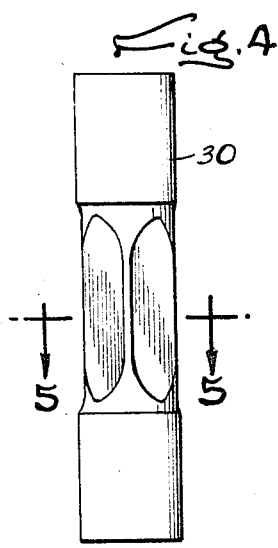
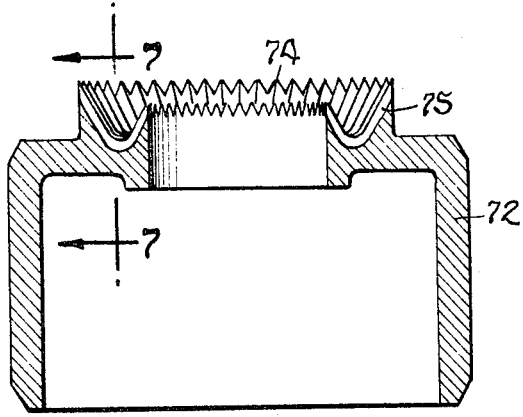
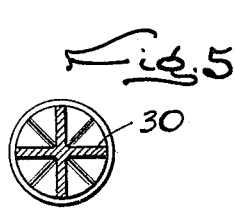
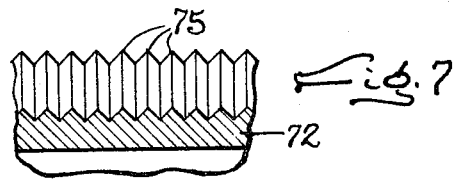
INVENTOR.
Raymond R. DeZurik
BY
Wolfe, Hubbard, Voit & Osann
ATTORNEY Nov. 15, 1966 R. R. DE ZURIK 3,285,057
APPARATUS FOR OBTAINING TORQUE MEASUREMENTS
Filed Aug. 19, 1963 2 Sheets-Sheet 2

INVENTOR.
Raymond R. DeZurik
BY
Wolfe, Hubbard, Voit & Osann
ATTORNEYS

United States Patent Office 3,285,057
Patented Nov. 15, 1966

3,285,057
APPARATUS FOR OBTAINING TORQUE
MEASUREMENTS
Raymond R. De Zurik, St. Cloud, Minn., assignor to
De Zurik Corporation, Sartell, Minn., a corporation of
Minnesota
Filed Aug. 19, 1963, Ser. No. 302,961
4 Claims. (Cl. 73—59)

The present invention relates to torque measuring apparatus, and more particularly concerns an apparatus for measuring torsional forces applied to a constantly rotating shaft.

In many instances it is desirable to obtain accurate and reliable measurements of the torque applied to a constantly rotating shaft. This is particularly true when the rotating shaft projects through a wall of a closed vessel containing a fluid medium. Measurements of the torsional reaction of a fluid to rotation of a shaft or sensing element are useful in process control installations where indications of viscosity, specific gravity or the state of some reaction are important. However, in the past, the available apparatus for measuring the torque on a rotating shaft has been unreliable and inaccurate due to the erratic friction generated in the seals and bearings which journal and support the sensing shaft with respect to the fluid containing vessel.

Various approaches have been tried in an effort to minimize the sources of error in obtaining such torque measurements. One suggested solution has been to make the torque to be measured much greater than the seal and bearing friction, and thus reduce the frictional effects to a minimum value. However, this usually results in a large, unwieldy apparatus requiring a large power input, which is often impractical. Attempts have also been made to develop better shaft seals and support bearings. These frequently turn out to be very critical, costly items that require frequent attention and servicing. Moreover, these devices are very often extremely sensitive to pressure changes and usually they are not adequate for small torque measurements.

Another approach has been the development of apparatus having an inner shaft that is magnetically coupled to an outer shaft which projects through a seal member. These devices, however, require bearing supports located inside the fluid containing vessel for journalling the internal shaft, and thus, a new source of friction is introduced. In addition, these devices are generally limited for use in non-abrasive media.

Yet another and more recent approach has been the application of strain gauges directly on the rotating shaft inside the fluid chamber. While this eliminates bearing and seal friction, it requires the use of slip-ring electrical connections to carry relatively low level signals. These, of course, frequently generate spurious signals, and therefore, they must be carefully maintained and serviced.

Other prior art torque measuring devices have also introduced other sources of error, such as additional support bearings for the torque motor. The friction generated in these additional support bearings, of course, enters into and alters the final torque measurements. Moreover, to prevent these bearings from creating abnormally high frictional errors, it is necessary to either manually or mechanically rotate or oscillate these bearings.

Accordingly, it is the primary aim of the present invention to provide an apparatus for measuring the true torque applied on a continuously rotating device. It is a more particular object to eliminate all of the variable and undesirable frictional errors which are generated in the support bearings and shaft seals in such a torque measuring apparatus.

It is another object to provide such a torque measuring apparatus in which the torsional reaction of the supporting elements can be readily and accurately determined and compensated for in the final torque measurements.

A further object is to provide an apparatus for measuring the torque on a constantly rotating shaft in which non-critical rotary shaft seals may be used since the friction generated in these elements is automatically compensated for within the apparatus and does not enter into the output torque measurement.

Yet another object is to provide a torque measuring apparatus as described above which is rugged and durable in construction, dependable and trouble free in operation and yet simple and economical to manufacture. Moreover, it is an object to arrange such an apparatus so that it may be installed in any angular orientation and so that either instantaneous or continuous torque measurements may be obtained.

Other objects and advantages of the invention will become more readily apparent upon reading the following detailed description and upon reference to the drawings in which:

FIGURE 1 is a partial schematic illustration of a typical prior art device for measuring the torsional reaction of a fluid on a rotating shaft;

FIG. 2 is a partial schematic illustration of a novel torque measuring apparatus embodying the present invention;

FIG. 4 is an enlarged elevational view of a flexure support element;

FIG. 5 is a section taken along the line 5—5 in FIG. 4;

FIG. 6 is an enlarged section of the lower hub of the static seal shown in FIG. 3; and FIG. 7 is a section taken along the line 7—7 in FIG. 6.

Figure 3:
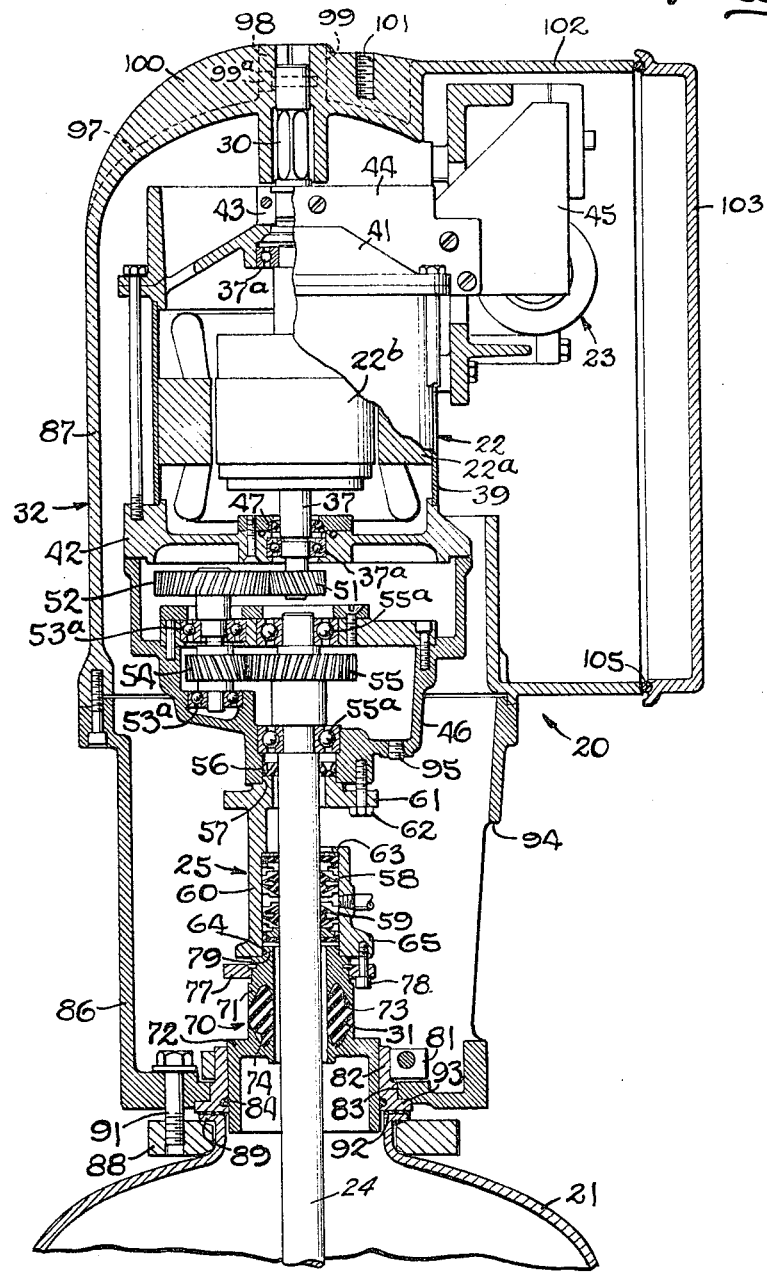
FIG. 3 is an enlarged cross sectional view of a preferred form of a torque measuring device of the type illustrated in FIG. 2 with portions broken away to illustrate various details of the exemplary embodiment of the invention.

While the invention will be described in connection with certain preferred embodiments and procedures, it will be understood that I do not intend to limit the invention to those specific embodiments and procedures. On the contrary, I intend to cover all alternatives, modifications and equivalents as may be included within the spirit and scope of the invention as defined by the appended claims.

Turning now to the drawings, there is shown in FIGURE 1 a conventional device 10 for measuring the torsional reaction of a fluid on a rotating shaft. It will be understood that such a torque measuring device may form a part of a typical consistency regulator. As shown here, the torque measuring device 10 includes a closed chamber or vessel 11 which contains a fluid medium P, the consistency of which is to be regulated in response to measurements of the torsional reaction of the fluid. A drive motor 12 is journalled for rotation on the pressure vessel 11 with the stator 12a of the motor connected to a sensing device 13 secured to the vessel 11. Connected to the rotor 12b of the motor, a rotatable shaft 14 projects into the vessel 11 through a shaft seal and bearing unit 15 which is also secured to the vessel. Inside the vessel 11, the shaft carries a sensing paddle 16 disposed in contact with the fluid medium P.

The conventional device 10 operates as follows in obtaining measurements of the torsional force exerted by the fluid P on the rotating shaft 14 and sensing paddle 16. The drive motor 12 is energized to rotate the shaft and paddle at constant speed. Since the paddle 16 is disposed in contact with the fluid P, a torsional force is imposed on the sensing paddle and the rotating shaft 14. This external torque is transmitted through the rotor 12b of the motor to the stator 12a and the motor housing. The sensing device 13 is arranged to resist rotation of the motor stator 12a with respect to the vessel 11 and thereby obtains a measurement of the torque exerted on the rotating paddle and shaft.

If no other torsional forces were imposed upon the shaft 14, the torque measured by the sensing device 13 would be a true indication of the torsional resistance of the fluid P to rotation of the sensing paddle 16. However, in all such prior art devices additional extraneous and unpredictable frictional forces enter into and alter the torque measured by the sensing device 13. In the conventional device 10, for example, the bearing and seal unit 15 performs several functions, each of which generate such extraneous frictional forces. Thus, not only does the bearing and seal unit serve to journal the rotating shaft 14 and seal the fluid medium P within the vessel 11, but it also serves as the support and journal for the motor housing 12. Therefore, sliding and rolling friction resisting rotation of the motor stator 12a is generated, as well as frictional resistance on the rotating shaft 14. Moreover, these frictional forces vary, for example, with the effects of temperature, humidity, pressure, vibration, lubrication, wear and other similar variable conditions. Accordingly, it will be appreciated that the torque measured by the sensing device 13 is increased by an amount corresponding to these frictional forces, which are so variable and unpredictable that they cannot be readily or accurately compensated for in the conventional torque measuring device 10.

In accordance with the present invention, a novel torque measuring apparatus 20 is provided for accurately obtaining true indications of the torsional forces loaded on a constantly rotating shaft. In the illustrated embodiment the novel torque measuring apparatus is constructed so as to eliminate all of the unpredictable frictional forces from the torque measurements. As shown in FIG. 2, the torque measuring apparatus 20 includes a chamber or vessel 21 for enclosing a fluid medium P, the torsional reaction of which is to be measured. Thus, the novel torque measuring apparatus may form a part of an improved consistency regulator or the like. A drive motor 22 is mounted above the vessel 21 with the stator 22a of the motor coupled through the motor housing to a sensing device 23. When energized, the rotor 22b of the drive motor 22 rotates a shaft 24 journalled in a rotary seal unit 25, and the shaft carries a sensing paddle 26 disposed in contact with the process fluid P.

Pursuant to the present invention, all of the sliding and rolling friction producing elements in the supporting mechanism for the motor 22 and rotatable shaft 24 of the torque measuring apparatus 20 have been replaced by flexure support elements 30 and 31 which have known and readily determinable stress-strain characteristics. The torsional reaction of the supporting elements 30, 31 as measured by their deflection incident to rotation of the paddle 26 in the fluid medium P, can thus be easily determined and compensated for in the final torque measurements. In addition, the rotary shaft seal 25 and the shaft bearings in the illustrated torque measuring apparatus 20 are coupled directly to the stator 22a of the drive motor 22 so that the shaft friction generated in these elements is automatically compensated for within the motor incident to rotation of the shaft 24 at constant speed.

Desirably, the drive motor 22, shaft 24, rotating seal assembly 25 and flexure support elements 30, 31 are enclosed within a protective shell 32 rigidly secured to the vessel 21. The protective shell 32 thus serves as a rigid supporting frame from which the motor 22 is suspended by the flexure support elements. The torque sensing and measuring device 23 of the present invention is also conveniently located within the protective shell 32. The sensing device 23 may comprise any suitable type of pick-off device adapted to read either force or motive values and convert these values to mechanical, pneumatic, hydraulic, or electrical outputs. In the preferred embodiment, the sensing device 23 is a force-to-pneumatic transducer which has been employed with excellent results. The shell 32 thus protects the torque measuring apparatus against mechanical damage or false output signals due to such causes as external forces, exposure to moisture or gases, or accidental contamination by process materials.

By supporting the motor stator 22a and the rotating shaft 24 on the flexure support elements 30, 31, all frictional forces due to rotating seals and bearings are eliminated from the measured torque. Moreover, since the sensing device 23 obtains the torque measurements from non-rotating components, the torque measurement apparatus 20 can be mounted either vertically, horizontally or at any inclined angle. In addition, in the illustrated embodiment, no shaft bearings are necessary within the vessel 21, due to the cantilevered suspension of the shaft 24 which projects into the vessel.

Referring now to FIGS. 3–7, a more detailed description of the drive motor 22 and rotary seal assembly 25, the flexure support elements 30, 31, the protective shell 32, and the torque sensing device 23 follows hereafter under separate headings. A brief resume of the operation of novel torque measuring apparatus 20 will then be given.

*The drive motor and rotary seal assembly*

The rotor 22b of the drive motor 22 is secured to a drive shaft 37 journalled in bearings 37a located in a motor housing 39 to which the motor stator 22a is secured. The housing 39 is preferably formed with a pair of upper and lower end bells 41 and 42, respectively. The top end bell 41 provides a mounting sleeve 43 for the flexure support element 30 and incorporates a special mounting pad 44 for attaching a torque arm 45. The lower end bell 42 of the motor housing 39 also serves as a cover for a gear housing 46. An oil seal 47 is secured to the lower end bell to prevent oil from entering the motor 22 from the gear housing. Preferably, both the motor housing 39 and gear housing 46 are cast from high strength aluminum in order to achieve light weight and optimum heat dissipation for the motor 22.

In the preferred embodiment, the motor 22 is of a size such that normal operation will demand only about one half of the rated motor output. This insures relatively constant speed operation and rotation of the shaft 24 even under substantial load changes. It also provides a relatively large power reserve for overload conditions which can easily occur in torque measuring operations.

Within the gear housing 46, a helical gear 51 mounted on the motor drive shaft 37 drives another helical gear 52 secured to an intermediate shaft 53 journalled in bearings 53a in the gear housing. The intermediate shaft 53 also carries another helical gear 54 for driving an output gear 55 secured to the upper end of the shaft 24 which is also journalled in bearings 55a within the gear housing 46. As shown in FIG. 3, the motor drive shaft 37 and the sensing shaft 24 are journalled for rotation about a common axis. Thus, the input gear 51 on the shaft 37 and output gear 55 on the shaft 24 are also coaxially mounted within the gear housing 46. To prevent oil from escaping from the lower end of the gear housing, an oil seal 56 sealingly engages the shaft 24. The lower end of the gear housing 46 also forms a pilot connection 57 for attachment of the rotary seal assembly 25.

Basically, the rotary seal assembly 25 includes two identical opposed face seal elements 58 and 59. The area between the seal elements is desirably pressurized with fresh water which serves to dissipate heat, lubricate the sliding surfaces and to prevent any process material from entering the seal area in the event of leakage. It will be understood that other types of seals such as purged face type seals might also be used without departing from the present invention. However, the double faced opposed design eliminates the necessity for continuous purging of water into the process material. It also makes the location on the shaft 24 noncritical since is does not depend upon shoulders, snap rings or set screws to hold the rotating parts.

For securing the rotary seal 25 to the gear housing 46, a seal housing 60 has been provided with an annular connecting flange 61 through which a plurality of cap screws 62, only one of which has been shown, may be inserted. The cap screws 62 are received in suitably threaded recesses in the gear housing 46 so that the seal housing 60 may be drawn snugly into the pilot connection 57. In the present instance, the seal housing 60 has also been provided with a vented area 63 between the seal parts and the gear housing. This insures that no water will find its way into the gear housing even if the seal 25 should fail. The lower end of the seal housing 60 is formed with a pilot connection 64 and bolting lugs 65 for attachment of the lower flexure support element 31.

From the above description it will be appreciated that the motor 22, gear housing 46, and seal assembly 25 are secured together to form a unitary drive unit. As previously mentioned, the motor 22 is suspended between the flexure support elements 30, 31, so that limited rotation relative to the vessel 21 can occur about the center line of the shaft 24. If the shaft 24 is now rotated by the motor at constant speed with no external torque applied on the shaft, an internal equilibrium condition exists. At equilibrium, there are no forces existing on the unitary body which will attempt to rotate the motor stator 22a about its axis. Thus, a torque measurement made between the assembly described above and the outer shell 32 will turn out to be zero. In other words, all of the frictional losses generated within the bearings, gears and seals are balanced internally by the motor and do not appear in the torque measurements.

*The flexure support elements*

In the preferred embodiment, the upper flexure support element 30 for the drive motor 22 is formed as a flexure pivot rod as shown in FIGS. 3 and 4. The flexure element 30 is also desirably formed with the center area milled out to form a "cross" shape as shown in FIG. 5, in order to achieve essentially linear deflection characteristics. Such a cross section may be formed, for example, with a double angle cutter having a 90° included angle. This formation provides a gradual taper from the round to the flats and results in ideal stress distribution throughout the flexure element.

The preferred material for the flexure support element 30 is a medium carbon, resulfurized alloy steel. This material combines high yield and high tensile strength with machinability and high fatigue resistance. In the preferred embodiment, the element 30 is formed with a torsional spring constant of approximately 125 foot pounds per radian and it is capable of torsional deflections exceeding 30 minutes of arc with no permanent set. It has also been found that the flexure element 30 can withstand axial compressive loads exceeding six tons and bending exceeding 30 minutes of arc due to radial torque of 30 foot pounds without producing a permanent set in the flexure. Thus, the rigidity and strength of the preferred flexure support element is readily apparent. However, it will also be understood that the flexure element 30 may be constructed from other materials and with different cross sections and design strengths depending on the particular use which is to be made of the torque measuring apparatus 20.

The construction and material of the preferred form of the lower flexure element 31 is also of importance both from torque measurement and process application considerations. In the present instance the flexure element 31 is a resilient elastomer material and forms an integral part of a static seal 70 which surrounds the shaft 24. Basically, the static seal 70 comprises two hubs 71 and 72 with the resilient flexure element 31 bonded between them. The hubs 71, 72 are each formed to define respective inner concave surfaces or cups 73 and 74 to hold the flexure element in position (see FIG. 6). Thus, even though the bond between the hubs and the elastomer completely fails, no leakage will occur, since internal pressure within the vessel 21 will normally maintain a tight seal on the outer half of the concave surface.

It will also be understood that the concave surfaces 73, 74 prevent the deformable elastomer material 31 from "blowing out" under pressure within the vessel 21, and the concave serves the same function for a pressure reversal condition. As shown in FIG. 7, the concave surfaces 73, 74 are also formed with a second special shape defining a continuous saw tooth 75. The saw tooth 75 is designed to firmly hold the flexure element 31 during torsional displacement even though the bond may have failed. This is important since it will be recognized that no slippage can be tolerated at this point since it would introduce an error in the sensing device 23.

Other features also result from the formation of the resilient flexure element 31 with a hollow cylindrical shape bonded to the hubs 71, 72. The heavy wall thickness of the deformable material will resist chemical attack for extended periods of time. It will also support the motor weight if the upper flexure support element 30 is damaged or becomes disconnected. The material for the deformable elastomer 31 is selected so that it is pliable enough to allow full excursion of the sensing device 23 without exceeding the linear stress-strain relationship for the elastomer. In this way, the torsional reaction of the flexure element 31 can be readily determined and compensated for.

For securing the static seal 70 to the rotary seal assembly 25, a retaining ring 77 surrounding the upper hub 71 is drawn upwardly by a plurality of cap screws 78 (only one of which is shown) so as to pull a reduced portion 79 of the hub 71 into the pilot connection 64 of the seal housing 60. The lower hub 72 is secured to the protective shell 32 by a clamp ring 81 adapted to draw an annular insert 82 tightly against the hub. The insert 82 is preferably received in an annular opening 83 in the lower portion of the shell 32 in a force fit relationship. Thus, the static seal 70 is locked within the outer shell 32 without depending upon the critical location of grooves, shoulders, or other projections on the lower hub 72. An O-ring 84 provides a static seal between the hub 72 and the annular insert 82.

It will now be appreciated that the rotatable shaft 24 is journalled and supported from the motor 22 without other contact with the protective shell 32 or the vessel 21. Thus, all of the friction due to bearings and gears in the gear housing 46 are automatically compensated for within the motor 22. Moreover, the friction generated in the rotary seal assembly 25 is also automatically cancelled out within the motor 22 since the seal housing 60 is rigidly secured through the gear housing 46 to the motor stator 22a. The static seal 70 is formed so no contact occurs with the shaft 24, and the resilient flexure element 31 both seals the opening between the vessel 21 and the protective shell 32 and also serves as a safety support for the motor 22. The principal support for the motor 22 is provided by the flexure pivot 30 which suspends the motor from the protective shell 32. Thus, the motor is supported for limited angular movement with respect to the protective shell incident to the application of a torsional force on the shaft 24 when it is rotated at constant speed with the paddle 26 in the fluid P.

The protective shell

In the illustrated embodiment, the protective shell 32 is made in two pieces 86 and 87 for convenience in assembly. The lower section 86 is rigidly secured to the vessel 21 by means of a heavy clamp ring 88 which is tightly drawn against an annular flange 89 on the vessel 21 by a plurality of bolts 91, only one of which is shown. Desirably, a sealing gasket 92 is interposed between a flange 93 on the lower hub retaining insert 82 and the flange on the vessel to prevent leakage of the fluid P from the vessel 21. The lower section 86 also is formed with a plurality of cut-outs 94 which expose the rotating seal 25 and static seal 70 to visual inspection and allow access to the cap screws 62, 78 and bolts 91. A drain plug 95 on the gear housing 46 is also accessible through these cut-outs 94, as is the water connection for the rotating seal 25.

The upper section 87 of the protective shell 32 completely encloses the motor 22, gear housing 46 and the flexure element 30. A crown-like portion 97 on the upper section is formed with a sleeve 98 for receiving the flexure element 30 which is secured to the crown 97 by a clamp ring 99 and bolt 99a. The crown 97 is desirably reinforced with a plurality of ribs 100, and provided with a taped recess 101 for a lifting eye to permit easy lifting and movement of the torque measuring apparatus 20.

In the preferred embodiment, an offset section 102 of the protective shell 32 is formed integrally with the upper section 87 for enclosing the sensing device 23. As shown in the drawings, the offset section 102 has a generally rectangular box-like configuration with one side opening into the upper section 87 and the opposite side provided with a hinged access door 103. A suitable latch (not shown) couples the door to the upper section and a peripheral sealing gasket 105 serves to maintain a moisture-tight connection when the door is closed. Thus, the offset portion 102 provides ample room for mounting the sensing device 23 in a protected area.

The sensing device

In the novel torque measuring apparatus 20, the torque measurements are obtained by measuring or sensing the angular movement of the torque arm 45 in relation to the outer shell 32 when the shaft 24, rotating at constant speed, is torsionally loaded. In this regard, it will also be understood that an external force must be applied to the motor stator 22a to oppose the tendency of the stator to rotate. This external force may, of course, be supplied entirely by the torsional resistance of the flexure supporting elements 30, 31 and the applied torque can be measured simply by calibrating the angular movement of the torque arm 45 since the elements 30, 31 have determinable deflection characteristics. Alternatively, the torsional resistance of the flexure support elements can be so small as to be practically negligible with respect to the measured torque and a calibrated spring or other force utilized to oppose the angular movement of the torque arm 24. In the latter instance the elements 30, 31 simply serve as frictionless pivots for the motor stator 22a and the minor amount of torsional resistance provided by the elements 30, 31 can be either neglected entirely or compensated for in the calibration of the external force resisting movement of the arm 24.

From the above discussion it will be apparent that in a simple form of the invention the sensing device indicated generally at 23 is not necessary since the angular displacement of the torque arm 24 can be measured and calibrated or computed to obtain the applied torque. However, in a more refined embodiment of the invention as illustrated in FIG. 3 a sensing device 23 in the form of a pneumatic transducer has been found to be advantageous. It will be understood that the sensing device 23 is secured to the protective shell 32 and is actuated by the angular movement of the torque arm 45 secured to the upper end bell 41 of the motor housing 39. The sensing device 23 may also take other forms such as an electrical transducer or the like and may incorporate a force feedback arrangement to the torque arm without departing from the present invention.

In the preferred form of the torque measuring apparatus 20, the pneumatic sensing device 23 requires a torsional deflection of less than one minute of arc for a full scale reading. This permits the sensing device to traverse its entire range under input movements that are small enough to insure that the lower resilient element 31 and upper flexure pivot 30 remain in the linear portions of their stress-strain curves. This, in turn, permits the static seal and flexure support to be large and physically strong so that they are capable of supporting the motor 22 and gear reduction assembly and still retain a large safety factor. Furthermore, the pneumatic sensing device 23 enables the torque measurements to be either read directly, continuously charted or communicated to an external control device.

Résumé

The operation of the novel torque measuring apparatus 20 may now be briefly described as follows. When a measurement of the torsional reaction of the fluid medium P is desired, the motor 22 is energized. The rotor 22b and drive shaft 37 of the motor 22 drive the sensing shaft 24 to rotate the sensing paddle 26 at a constant speed within the vessel 21. The torsional reaction of the fluid medium P to the rotating paddle 26 imposes a torque on the shaft 24. This torque upsets the internal equilibrium of the motor 22 thereby causing the motor stator 22a to attempt to rotate about the motor axis. This attempt of the motor stator 22a to rotate is transmitted through the upper bell portion 41 of the motor and the torque arm 45 to the sensing device 23.

Deflection of the torque arm 45 is detected by the sensing device 23, in this case a pneumatic transducer which produces a pneumatic output signal as a measure of torsional resistance of the fluid P to rotation of the shaft 24. The only other forces which affect the torque measured by the sensing device 23 are the torsional forces produced by the deflection of the flexure pivot 30 and the resilient seal element 31. As previously mentioned, both of these elements are selected so as to have linear stress-strain characteristics through the small range of movement necessary to obtain a full scale torque measurement reading. Therefore, the torque due to angular deflection of the flexure support elements 30, 31 can be completely eliminated from the final torque measurement reading. Accordingly, the torque measuring apparatus 20 is capable of providing true torque readings from which substantially all of the errors due to external frictional forces have been removed.

The illustrative torque measuring apparatus 20 of the present invention is especially adapted for use with continuous fluid control devices. Thus, it will be appreciated that the preferred sensing device 23 is capable of making continuous torque measurements for an automatic control function. It should be recognized, however, that many other applications can be visualized for the novel torque measuring apparatus 20 wherein other types of sensing arrangements could be utilized. Thus, the novel torque measuring apparatus of the present invention could be readily adapted to non-process control mechanisms such as dynamometers for use in measuring seal, bearing or gear frictions, or for other process control applications such as in the starch, paint or food industries. In many of these instances, a pressurized vessel 21 may not be necessary and the rotary seal assembly 25 and even the static seal 70 might be eliminated. In the latter case, only a single flexure support element 30 is necessary.

It will be recognized that although a preferred construction of the flexure elements 30, 31 have been illustrated, various alternative constructions might also be employed without departing from the present invention. Moreover, the simplicity of construction of the novel torque measuring apparatus and its freedom from critical dimensions of internal parts affords a rugged and trouble-free apparatus in operation which is also economical to build and maintain.

I claim as my invention:

1. In a consistency sensing device including torque measuring apparatus, the combination comprising, a vessel for enclosing a fluid medium, a rotatable shaft projecting into said vessel and carrying a sensing element disposed in contact with said fluid, a motor having a stator and a rotor with the rotor drivingly coupled to said shaft, said stator including a seal housing enclosing a rotary seal in which said shaft is journalled for preventing the passage of said fluid into said motor, said shaft being journalled and supported from said stator and said rotary seal without other frictional contact with said vessel, and a flexure element having determinable deflection characteristics supporting said stator for limited angular movement with respect to said vessel and without other frictional engagement with said vessel so that all of the rotating friction generated by said apparatus when said shaft is rotated is internally cancelled within said motor and the deflection of said flexure element is an accurate proportional measure of the true torsional resistance of said fluid to rotation of said sensing element.

2. In a consistency sensing device including torque measuring apparatus, the combination comprising, a vessel for enclosing a fluid medium, a rotatable shaft projecting into said vessel and carrying a sensing element disposed in contact with said fluid, a motor having a stator and a rotor with said rotor drivingly coupled to said shaft, said stator including a seal housing enclosing a rotary seal in which said shaft is journalled for preventing the passage of said fluid into said motor, a flexure pivot havnig predetermined torque versus deflection characteristics supporting said stator for limited angular movement with respect to said vessel and without other frictional engagement with said vessel, a static seal interconnecting said vessel and said seal housing for preventing the escape of said fluid medium from between said vessel and said rotary seal, said shaft being journalled and supported from said stator and said rotary seal without other frictional contact with said static seal and said vessel, said static seal havnig predetermined torque versus deflection characteristics, and detecting means for sensing the angular displacement of said stator with respect to said vessel whereby all of the rotating friction generated by said apparatus when said shaft is rotated is internally cancelled within said motor and the true torsional resistance of said fluid to rotation of said sensing element is accurately indicated in proportion to the deflection of said flexure pivot and said static seal.

3. In a consistency sensing device including torque measuring apparatus, the combination comprising, a vessel for enclosing a fluid medium, a rotatable shaft projecting into said vessel and carrying a sensing element disposed in contact with said fluid, a motor having a stator and a rotor with said rotor drivingly coupled to said shaft, a gear housing secured to said stator, said housing enclosing an input gear and an output gear respectively coupled to said rotor and said shaft with intermediate speed reducing gears interposed therebetween, a seal housing secured to said gear housing and enclosing a rotary seal in which said shaft is journalled for preventing the passage of said fluid into said gear housing and motor, a flexure pivot having predetermined torque versus deflection characteristics supporting said stator for limited angular movement with respect to said vessel and without other frictional engagement with said vessel, a static seal interconnecting said vessel and said seal housing for preventing the escape of said fluid medium from between said vessel and said rotary seal, said shaft being journalled and supported from said stator and said rotary seal without other frictional contact with said static seal and said vessel, said static seal formed of a resilient material having predetermined torque versus deflection characteristics and having non-slip surfaces adapted for connection to said vessel and said seal housing, and detecting means for sensing the angular displacement of said stator with respect to said vessel whereby all of the rotating friction generated by said apparatus when said shaft is rotated is internally cancelled within said motor and the true torsional resistance of said fluid to rotation of said sensing element is accurately indicated in proportion to the deflection of said flexure pivot and said static seal.

4. In a consistency sensing device including torque measuring apparatus, the combination comprising, a vessel for enclosing a fluid medium, a rotatable shaft projecting into said vessel and carrying a sensing element disposed in contact with said fluid, a motor having a stator and a rotor with said rotor drivingly coupled to said shaft, said stator including a seal housing enclosing a rotary seal in which said shaft is journalled for preventing the passage of said fluid into said motor, a flexure pivot having predetermined torque versus deflection characteristics supporting said stator for limited angular movement with respect to said vessel and without other frictional engagement with said vessel, a static seal interconnecting said vessel and said seal housing for preventing the escape of said fluid medium from between said vessel and said rotary seal, said shaft being journalled and supported from said stator and said rotary seal without other frictional contact with said static seal and said vessel, said static seal formed of a resilient material having predetermined torque versus deflection characteristics, upper and lower hubs non-rotatably connected to said seal housing and said vessel, respectively, said hubs each having a concave cup portion defining a continuous circumferential saw-tooth surface engaging said resilient static seal, and detecting means for sensing the angular displacement of said stator with respect to said vessel whereby all of the rotating friction generated by said apparatus when said shaft is rotated is internally cancelled within said motor and the true torsional resistance of said fluid to rotation of said sensing element is accurately indicated in proportion to the deflection of said flexure pivot and said static seal.

References Cited by the Examiner

UNITED STATES PATENTS

| | | | |
|---|---|---|---|
| 579,643 | 3/1897 | Gleason. | |
| 2,519,378 | 8/1950 | Kilpatrick | 73—59 |
| 2,845,795 | 8/1958 | Emmerling | 73—136 |
| 2,972,881 | 2/1961 | Koch | 73—9 |
| 3,169,392 | 2/1965 | Brookfield | 73—59 |
| 3,181,349 | 4/1965 | Jansson | 73—59 |

FOREIGN PATENTS 1,270,597  7/1961  France.

DAVID SCHONBERG, *Primary Examiner.*